(12) United States Patent
Tuori et al.

(10) Patent No.: US 6,217,782 B1
(45) Date of Patent: Apr. 17, 2001

(54) COMBINED ULTRASONIC CLEANING AND WASHING OF FILTER DISKS

(75) Inventors: Timo Tuori; Hannu Sekki; Jorma Ihalainen; Pentti Pirkonen; Hannu Mursunen, all of Jyväskylä (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 09/284,408

(22) PCT Filed: Oct. 9, 1997

(86) PCT No.: PCT/FI97/00617

§ 371 Date: Jun. 21, 1999

§ 102(e) Date: Jun. 21, 1999

(87) PCT Pub. No.: WO98/17370

PCT Pub. Date: Apr. 30, 1998

(30) Foreign Application Priority Data

Oct. 17, 1996 (FI) .......................................... 964169

(51) Int. Cl.[7] ........................... B01D 37/00; B01D 33/21; B01D 33/50; B01D 33/54
(52) U.S. Cl. ........................ 210/785; 210/797; 210/805; 210/331; 210/391; 210/408; 210/409
(58) Field of Search ..................................... 210/330, 331, 210/748, 780, 785, 791, 797, 798, 805, 391, 407, 408, 409

(56) References Cited

U.S. PATENT DOCUMENTS

| | | | |
|---|---|---|---|
| 3,707,230 | * 12/1972 | Davidson | 210/384 |
| 4,357,758 | 11/1982 | Lampinen | 34/9 |
| 4,946,602 | * 8/1990 | Ekberg et al. | 210/785 |
| 5,039,347 | * 8/1991 | Hindstrom et al. | 210/785 |
| 5,151,186 | * 9/1992 | Yoo et al. | 210/541 |
| 5,653,816 | * 8/1997 | Ekberg | 210/785 |

FOREIGN PATENT DOCUMENTS

| | | |
|---|---|---|
| 61739 | 9/1982 | (FI) . |
| 76705 | 12/1988 | (FI) . |
| 82388 | 3/1991 | (FI) . |

* cited by examiner

*Primary Examiner*—Robert Popovics
(74) *Attorney, Agent, or Firm*—Morgan & Finnegan, LLP

(57) ABSTRACT

The invention relates to a method and apparatus for cleaning the filter surface (2, 3) of a filter medium in a suction drier. According to the invention, in order to mark the surface to be cleaned, in contact with the surface to be cleaned there is set a sealing surface (4) that forms an essentially closed space for the surface to be cleaned, and that into said closed space, there is conducted cleaning liquid (7) in order to carry out the cleaning.

5 Claims, 2 Drawing Sheets

COMBINED ULTRASONIC CLEANING AND WASHING OF FILTER DISKS

Figure 1:
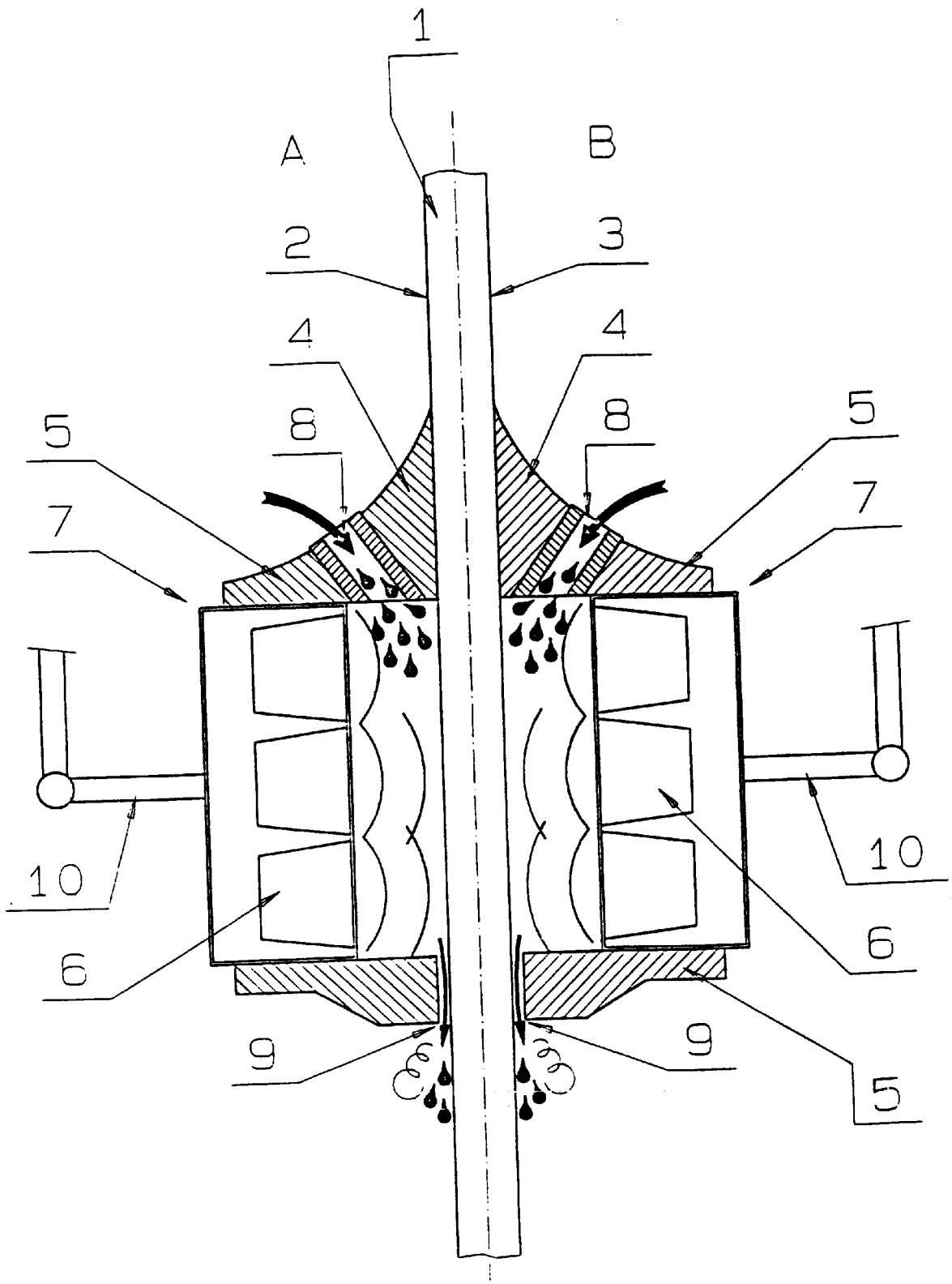

The invention relates to a method and apparatus for cleaning the filter surface of the filter medium in a suction drier, advantageously by ultrasound in an essentially continuous operation.

The FI patent 61,739 introduces a drying method and apparatus for drying web-like, pulverous, solid or porous material, in which method the material to be dried is put, by intermediation of a fine porous liquid-saturated suction surface, into hydraulic contact with a liquid maintained at an under pressure in relation to the material to be dried. The apparatus used in said method comprises a fine porous liquid suction surface, where the radii of the fine pores are mainly within the range 0.5–2 micrometers.

The fine porous liquid suction surface forms the filter surface for the filter medium of the suction drier, which filter surface is set into contact with the material to be dried, such as slurry. When the filter surface is for instance plane-like, and when there is created under pressure at the surface opposite to the filter surface of the filter medium, on the filter surface there is created, due to the suction, a cake filtered of the material to be dried, which cake is then scraped off the filter surface. However, the filter surface is susceptible to choking, because the pore structure of the filter surface of the filter medium, and thus also that of the filter medium itself, is gradually filled with finely divided material to be dried.

It is known in the prior art to use ultrasound in the cleaning of the filter surface of the filter medium in a suction drier, as is described in the FI patent 76,705. In the method of this FI patent 76,705, the use of ultrasound requires that for the duration of ultrasonically boosted cleaning, the filter surface is set into contact with a connecting and cleaning liquid, such as water. In that case, when the filter surface is surrounded by water, the required ultrasound power is not very high, and the risk of corrosion caused by cavitation is eliminated. However, the changing of the material surrounding the filter medium reduces the capacity available in the suction dryer, and thus increases the installation and running costs of the suction dryer.

From the FI patent 82,388, there is known a cleaning method for the filter medium of a suction drier, in which method the cleaning with an ultrasonic oscillator takes place essentially immediately after scraping the filter medium. In this method of the FI patent 82,388, the ultrasonic oscillator is located in the tank of the slurry to be filtered, underneath the liquid surface, in order to carry out the cleaning of the filter medium in continuous operation. With a high solid content of the surrounding slurry, the required ultrasonic power rises high, too. Likewise, the surrounding slurry corrodes the shell of the ultrasonic oscillator due to intensive cavitation. An increase in the ultrasonic power and the changing of the oscillator shells raise the running costs of the suction drier.

The object of the present invention is to eliminate some of the drawbacks of the prior art and to realize an improved and more feasible apparatus for cleaning the filter surface of the filter medium in a suction drier, advantageously by ultrasound in an essentially continuous operation, so that the cleaning unit utilizing ultrasound can be installed above the slurry surface in order to simplify the structure and to enable maintenance.

According to the invention, the cleaning space remaining in between the filter medium and the ultrasound source is marked by a sealing surface made of some elastic material, and this cleaning space is kept liquid-saturated during the cleaning operation. In order to carry out the cleaning according to the method of the invention, the ultrasound source and the sealing surface made of some elastic material are put into contact with the filter surface to be cleaned, at least for the duration of the cleaning cycle. During the cleaning cycle, into the cleaning space there is fed cleaning liquid, which— depending on the surface to be cleaned and the material contained thereon—is for instance water, acid, a liquid used as such for cleaning, an auxiliary agent intensifying the cleaning effect or a combination of said liquids. After the cleaning cycle has terminated, the cleaning unit is advantageously movable, so that in between the cleaning cycles, the cleaning unit can be kept at a distance from the filter surface to be cleaned.

The apparatus according to the invention advantageously comprises means for creating the ultrasound and means for marking the desired cleaning space in between the surface to be cleaned and the ultrasound source. The ultrasound source consists of one or several ultrasound transmitters, which can be arranged, in relation to each other, either parallel or so that the ultrasound radiation from the transmitters is oriented in a focusing fashion. A single ultrasound transmitter can also be made to operate in a focusing manner. In order to mark the cleaning space, around the ultrasound source there is advantageously arranged a sealing surface made for example of some elastic material, which sealing surface can be set into contact around the surface to be cleaned. The sealing surface can be designed either so that it marks a desired area for cleaning on the surface to be cleaned, or so that it simultaneously marks the essentially whole surface to be cleaned. Moreover, by means of the sealing surface made of some elastic material, the distance of the ultrasound source from the surface to be cleaned can be adjusted to be of the desired length. The apparatus according to the invention can also be used without the ultrasound source, in which case the member used for marking the whole cleaning space can be made of some elastic material, for instance.

During a cleaning cycle, the cleaning space according to the invention is advantageously formed of a protective surface, one wall of which is located in front of the ultrasound source, and of the surface to be cleaned and located against said wall. These two walls of the cleaning space are interconnected by a sealing surface made of some elastic material and attached either to the protective surface of the ultrasound source or around said protective surface.

When it is desired to clean a filter surface that is formed of filter surfaces located on opposite sides of the filter medium, the cleaning space according to the invention is advantageously created for both surfaces simultaneously, in which case the filter medium will be cleaned on both sides. Thus the surface to be cleaned can be changed, and the cleaning of a new filter surface or filter surface area can be started on both sides simultaneously.

Because the ultrasound source, according to the invention, is installed separately from the space filled with slurry containing the solids to be filtered, the casing of the ultrasound source can be advantageously made of some cheaper material, because the rest of the walls of the ultrasound source casing—apart from the protective surface located nearest to the surface to be cleaned—must only represent the quality level required of dust and splash protection. The simple structure of the casing also makes it easier to maintain and repair the ultrasound source.

According to the invention, the area to be cleaned can advantageously be adjusted to a desired size. Likewise, effective use can be made of the holding capacity of the cleaning space, because the cleaning liquid is conducted directly into the cleaning space, and after cleaning further to its own tank, first to be recleaned and thereafter to be recirculated. Thus the demand for the required cleaning liquid remains essentially small. In addition to this, the cleaning can advantageously be carried out as on online-operation. The cleaning can also be performed without interrupting production, because the cleaning is done completely separately with respect to the formation of the filter cake of the suction drier, water discharge and the removal of the cake from off the filter surface.

Figure 2:
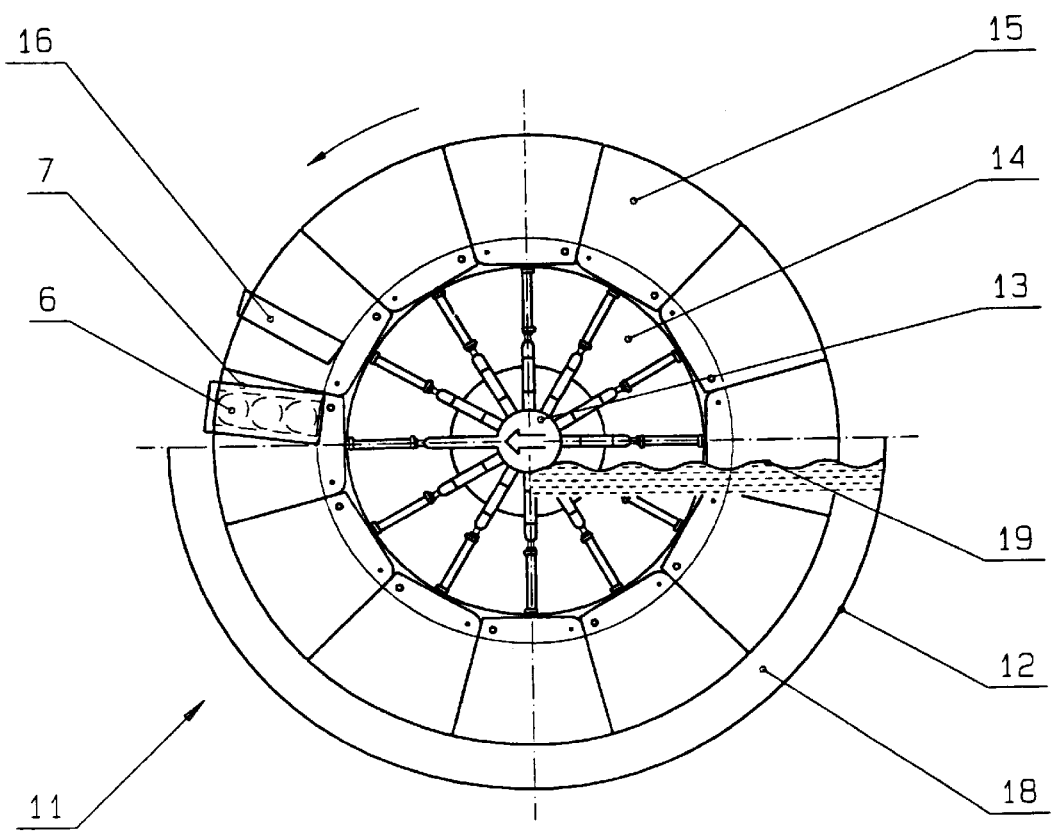

The invention is explained in more detail below, with reference to the appended drawing, where FIG. 1 is a schematical illustration of a preferred embodiment of the invention during the cleaning cycle of the filter surface, and FIG. 2 illustrates the location of the embodiment according to FIG. 1 in the suction drier, seen in a schematical cross-section.

According to FIG. 1, on the opposite sides A and B of the filter medium 1, there are provided filter surfaces 2 and 3, and in contact with said filter surfaces there are the sealing surfaces 4 that mark the cleaning space and are made of some elastic material. The sealing surfaces 4 belong to the sealing elements 5 that are attached around the ultrasound sources 6. The sealing element 5 and the ultrasound source 6 together form a cleaning unit 7 used for cleaning. In the sealing elements 5, on the opposite sides thereof, there are provided apertures for the feeding 8 and removing 9 of the cleaning liquid. In the cleaning unit 7, there are installed members 10 for moving the cleaning unit 7 in between the cleaning position and the rest position. By means of the motion members 10, the distance between the ultrasound sources 6 and the surfaces 2 and 3 to be cleaned can be adjusted.

In FIG. 2, the suction drier 11 comprises a slurry tank 12, a disc 14 rotated around an axis 13, to which disc the filter medium 15 and its filter surface 2 are attached, and a scraper 16 for removing the filter cake formed on the filter surface 2. The cleaning unit 7 and the ultrasound source 6 contained therein are located above the slurry surface 17, apart from the slurry space 18.

What is claimed is:

1. A method for cleaning the filter surface of a filter medium in a suction drier comprising defining an area of the surface of the filter to be cleaned, separating from a space filled with slurry containing solid matter to be filtered said area of the surface of the filter to be cleaned by surrounding the area of the surface of the filter to be cleaned with a sealing surface and a movable surface of a cleaning unit to form an essentially closed cleaning space introducing cleaning liquid into the closed cleaning space so as to contact the area of the filter surface to be cleaned, applying from a location outside the space filled with slurry containing solid material to be filtered ultrasound beams on the area of the filter surface to be cleaned to effect the cleaning of the filter surface, and removing from the closed cleaning space the cleaning liquid and finely divided material from the cleaned filter surface.

2. The method of claim 1 wherein sufficient cleaning liquid is introduced into the closed cleaning space to keep the closed cleaning space liquid-saturated during the cleaning treatment.

3. The method of claim 1 further comprising filtering the finely divided material from the cleaning liquid removed from the closed cleaning space, and recycling said filtered cleaning liquid into said closed cleaning space.

4. The method of claim 1 wherein said ultrasound beams are applied onto the area of the filter surface to be cleaned from a location above the closed cleaning space.

5. The method of claim 1 further comprising moving the movable surface between a rest position and a cleaning position, the moveable surface in the cleaning position being a desired distance between said ultrasound beams and the surface of the filter medium to be cleaned, the movable surface in the cleaning position defining part of the closed cleaning space.

* * * * *